(12) United States Patent
Miller

(10) Patent No.: US 9,173,510 B1
(45) Date of Patent: Nov. 3, 2015

(54) FRAME HANGING WIRE POST WITH LOCKING CONNECTOR

(71) Applicant: Robert W. Miller, Huntington Beach, CA (US)

(72) Inventor: Robert W. Miller, Huntington Beach, CA (US)

( * ) Notice: Subject to any disclaimer, the term of this patent is extended or adjusted under 35 U.S.C. 154(b) by 0 days.

(21) Appl. No.: 14/280,131

(22) Filed: May 16, 2014

(51) Int. Cl.
*A47G 1/16* (2006.01)
*F16G 11/05* (2006.01)
*F16G 11/14* (2006.01)

(52) U.S. Cl.
CPC .............. *A47G 1/1666* (2013.01); *F16G 11/05* (2013.01); *F16G 11/14* (2013.01)

(58) Field of Classification Search
CPC ....... A47G 1/1666; F16G 11/05; F16G 11/14; F16B 45/00; Y10T 24/44; Y10T 24/44026; Y10T 24/3916
USPC ........................................................... 248/493
See application file for complete search history.

(56) References Cited

U.S. PATENT DOCUMENTS

| | | | | |
|---|---|---|---|---|
| 1,262,951 A * | 4/1918 | Houff | ........................... | 24/135 R |
| 2,819,923 A * | 1/1958 | Anderson | .............. | A01M 31/00 294/150 |
| 3,094,755 A * | 6/1963 | Casanave | ................. | F16G 11/00 114/230.2 |
| 4,040,149 A * | 8/1977 | Einhorn | .................... | A47G 1/20 24/115 K |
| 6,094,783 A * | 8/2000 | Parsons | .................. | B60P 7/0823 114/218 |
| 7,854,044 B1 * | 12/2010 | Tillitski | ................... | F16G 11/05 24/122.6 |
| 8,695,936 B2 * | 4/2014 | Park | ........................ | A47G 1/168 24/115 R |
| 2006/0190041 A1 * | 8/2006 | Fallin | ................. | A61B 17/0401 606/232 |
| 2006/0293709 A1 * | 12/2006 | Bojarski | ............ | A61B 17/0401 606/232 |
| 2007/0079483 A1 * | 4/2007 | Gunnarsson | ........... | A01K 75/00 24/129 R |
| 2007/0100345 A1 * | 5/2007 | Fernandez | .............. | A61B 17/82 606/74 |
| 2008/0163466 A1 * | 7/2008 | Duggan | .................. | F16G 11/00 24/458 |
| 2009/0083947 A1 * | 4/2009 | Kubli | ...................... | B63B 21/04 24/115 H |
| 2010/0050397 A1 * | 3/2010 | Kohler | ...................... | A63B 9/00 24/129 R |
| 2013/0017011 A1 * | 1/2013 | Miron | ...................... | F16G 11/14 403/52 |
| 2013/0185900 A1 * | 7/2013 | Campbell | ............. | F16G 11/101 24/301 |
| 2013/0219669 A1 * | 8/2013 | Lin | ....................... | F16G 11/108 24/115 H |

* cited by examiner

*Primary Examiner* — Mark Wendell

(57) ABSTRACT

A hanging wire post with a locking connector for decorative hanging applications. This hanging wire post would be alternate to using eyelets or D-rings for attachment point of hanging wire to frame. This hanging post will install to frame with a single center-point screw. This post supports the hanging wire which is threaded through and around backside of post resulting in a frictional grip on wire that facilitates wire length adjustment. The hanging wire is then locked into position with the parallel line locking connector. The result is a very high strength end connection, and very quick and precise installation. No frustration of trying to tie precise knots in stranded wire or stranded wire rope. This device will work equally well with coated or uncoated stranded wire and wire rope.

1 Claim, 2 Drawing Sheets

FRAME HANGING WIRE POST WITH LOCKING CONNECTOR

CROSS-REFERENCE TO RELATED APPLICATIONS

None

BACKGROUND OF THE INVENTION

Hanging wires for picture frames and other architectural items are typically suspended with stranded load-rated steel wire with wire outside diameters (OD) of 0.032 to 0.092". The stranded wires are now available with a polymeric coating which prevents the sheared ends of wire from having splayed strands that can easily puncture skin.

Decorative hangings are typically supported in a structural frame which will be supported by a hanging wire that attaches to either eyelets or D-rings attached to frame. The eyelet is relatively weak and is subject to bending and/or dislodging from picture frame. The D-ring having a heavier attach screw(s) is a better method for attaching to frame. However both types will require tying the wire to the eyelet or D-ring. Obtaining the exact desired length of a hanging wire while tying in a knot is the first part of problem, and the second is the stiff stranded wires do not lend themselves to be formed into taut configurations of a knot.

BRIEF SUMMARY OF THE INVENTION

Accordingly, it is the general purpose of the present invention to provide a hitching post for frames of decorative hanging items that will facilitate connecting and adjusting lengths of the structural hanging wires. The hitching post described in the drawings, can be easily attached to frame, and then be quickly threaded with the hanging wire. The hanging wire is adjusted to desired length and then locked into position with the described parallel line connector. This preferred parallel line connector type is an improvement over the typical swaged ferrule type of parallel line splice connector. This preferred parallel line connector has a very low profile, is easily installed with no special tooling and develops a connected strength equal to the rated load for the structural wire. All current parallel line wire connectors require that with coated wire, the coating must be removed in order to install connector. With this inventive connector, the thread of the advancing locking screw will slice through the polymer coating on coated hanging wires to provide a mechanical lock on the steel strands of the wire, thus enabling the connector to be used with coated wire. This inventive frame post with connector will provide an assembly strength of wire to frame equal to the load rating of the hanging wire.

BRIEF DESCRIPTION OF DRAWINGS

The aforementioned objects and advantages of the present invention, as well as additional objects and advantages thereof, will be more fully understood herein as a result of the detailed description of a preferred embodiment when taken in conjunction with the following drawings.

DETAILED DESCRIPTION OF THE INVENTION

Figure 1:
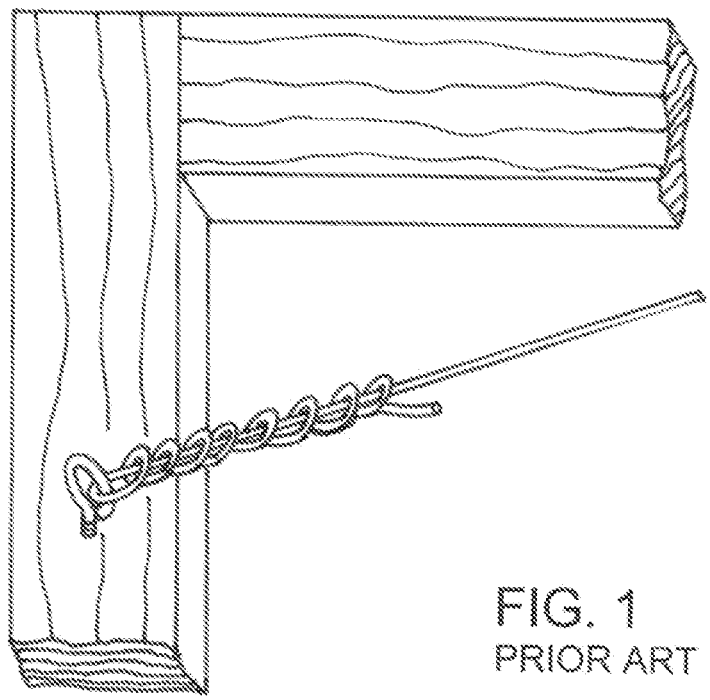
FIG. 1 is a perspective drawing showing typical prior art of method of attaching structural hanging wire to eyelet or D-Rings.
Figure 5:
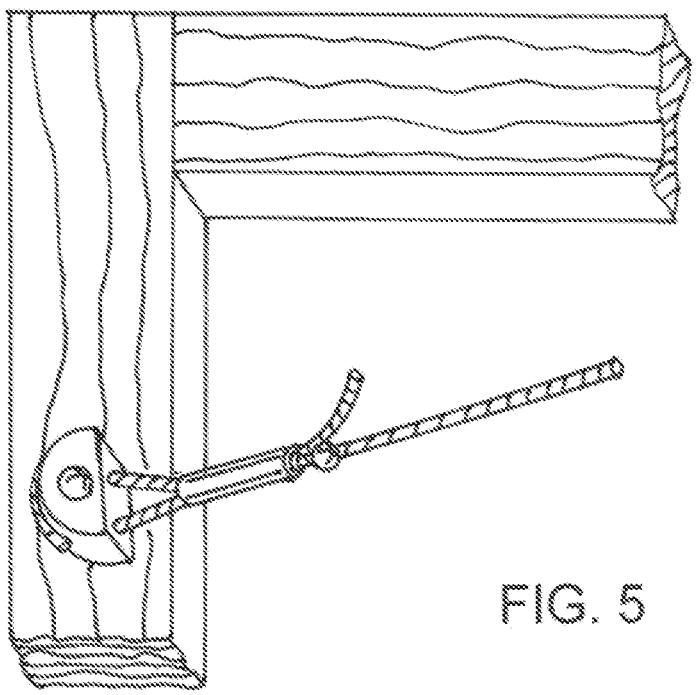
FIG. 5 is a perspective illustration of a hanging wire post installed on a picture frame with the locking connector in position with the locking screw installed.
Figure 2A:
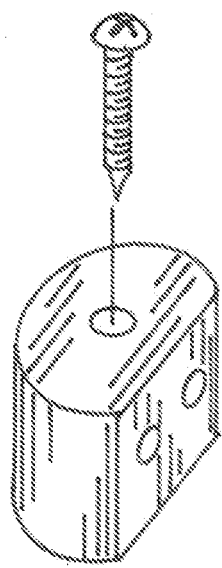
FIGS. 2A and 2B are perspective drawings of the inventive hitch post less the parallel line connector.
Figure 2B:
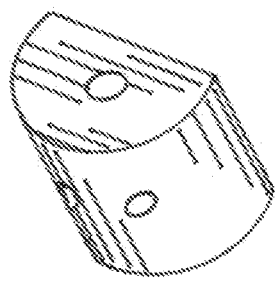
Figure 3:
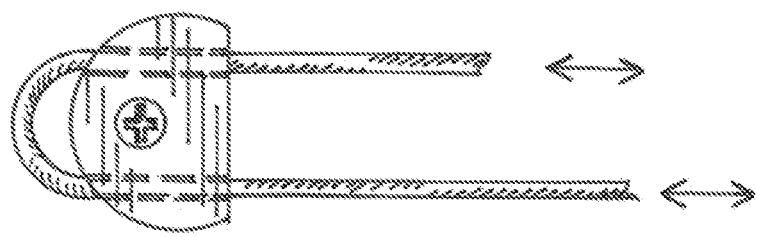
FIG. 3 is a top view of post showing hanging wire threaded through post, and how the wire length is adjusted by pulling/pushing on parallel wires extending from post.
Figure 4:
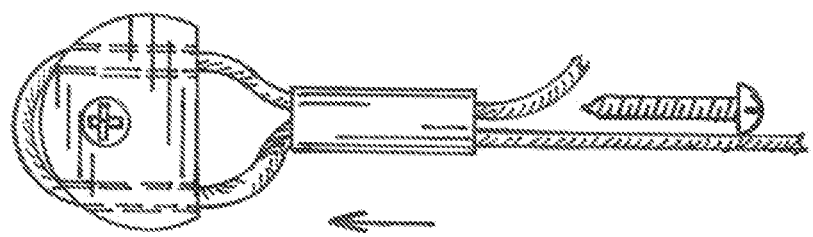
FIG. 4 illustrates how the parallel line connector is slid up in position, capturing both wire segments from post, and is in position to be locked in place with the locking screw.

This basic hitching post is a short length (0.60" typ) of a circular/semicircular rod section with a center point bore (0.160" inside diameter (ID) typical) that will accept the attach screw to attach this post section to frame. This post section will typically have parallel bore holes that allow the hanging wire to be threaded through, looped around back side of circular section of post, and threaded back through second bore hole with enough extra length to allow for installation of the parallel line splice connector. Ideally the component materials for completing an installation would be supplied as a kit; containing the particular strength-rated hanging wire and the corresponding hitch posts with locking connectors. The bore hole diameters for posts would typically be about 1.2 times the actual wire OD. The centerline spacing between the parallel boreholes would be about 4.2 times the wire OD. Typically the diameter of post would be 0.50 inch for wire up to 0.050" OD, and 0.75 inch for wires up to 0.100". This hole/wire configuration will result in some friction so that wire position will be readily adjustable by hand, but will hold position to allow for precise length adjustment. Prior to threading the post, the parallel line connector will be slid onto the mid-section of the hanging wire, so as to be in position to capture the free end of wire that will be threaded back through post. After the length of the hanging wire is established, the waiting parallel line connector is slid up to pick up the parallel wire segment extending out of the second borehole, connector is moved up snug to post and then the locking screw is installed to complete the parallel line-splice connection.

The locking connector of this device is similar to a swaged ferrule sleeve type of connector for parallel line splicing except the ferrule is a high strength plastic cylinder sized to accept the two parallel hanging wires through the bore that are then locked into position by the self tapping locking screw inserted into the bore that develops a compressive lock between the wires and the encompassing cylinder by the advancing lock-screw. The described connector can be used with uncoated or plastic coated hanging wire. A typical connector for a $1/16^{th\ inch}$ wire rope plastic coated (OD 0.098" typ) would be as follows: Cylinder OD 0.31" length 0.75", Bore 0.210". Locking-screw is #6 3/4" length. Properly installed to adequate frame, this wire post with connector combination will have an assembly strength exceeding the rated wire load of 96 pounds. For this application, the advantage of this connector is that it requires no special tool, and is immediately adjustable. If the installed hanging line is too long/short, one removes the locking screw, and readjusts the line positions in the connector.

The invention claimed is:

1. A system for supporting a frame for architectural decorative objects, said system comprising:
   an adjustable hanging wire;
   a post having a front face, a back face, a flat bottom surface and a semi-circular surface with a circumference defined by said front and back face and said flat bottom surface; said post further comprising an axial through-bore extending from the front face to the back face and configured to accept an attachment screw to secure said post to a frame structure; said post further comprising a first and second borehole each vertically extending from said flat bottom surface, through said post, to said semi-circular surface;

wherein said adjustable hanging wire is threaded through said first borehole from said flat bottom surface and loops around said post, in contact with said semi-circular circumferential surface, and passes through said second borehole from said semi-circular surface such that said hanging wire emanates from said flat bottom surface in two adjacent strands; further wherein said boreholes are parallel and equally spaced from a center line bisecting said semi-circular shaped surface and said boreholes being of a specified diameter to allow said hanging wire to be secured in position by a frictional resistance from the radii of said post yet still be able to be adjustable by hand to enable precise adjustment; and a wire locking connector comprising a sleeve which encompasses both strands of hanging wire emanating from said flat bottom surface and a lock-screw which, in the installed state, provides a direct frictional engagement between said strands of hanging wire and said sleeve.

* * * * *